Figure 1:
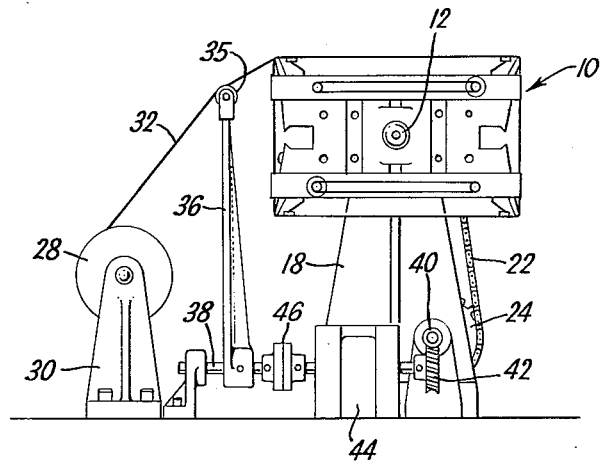

Sept. 12, 1961  A. SANDOR  2,999,300
APPARATUS AND METHOD FOR PRODUCING CATHODE RAY TUBES
Filed Feb. 3, 1958  6 Sheets-Sheet 1

INVENTOR
*AURELIUS SANDOR*

Sept. 12, 1961          A. SANDOR          2,999,300

APPARATUS AND METHOD FOR PRODUCING CATHODE RAY TUBES

Filed Feb. 3, 1958          6 Sheets—Sheet 2

INVENTOR
*AURELIUS SANDOR*

Sept. 12, 1961     A. SANDOR     2,999,300
APPARATUS AND METHOD FOR PRODUCING CATHODE RAY TUBES
Filed Feb. 3, 1958     6 Sheets-Sheet 4
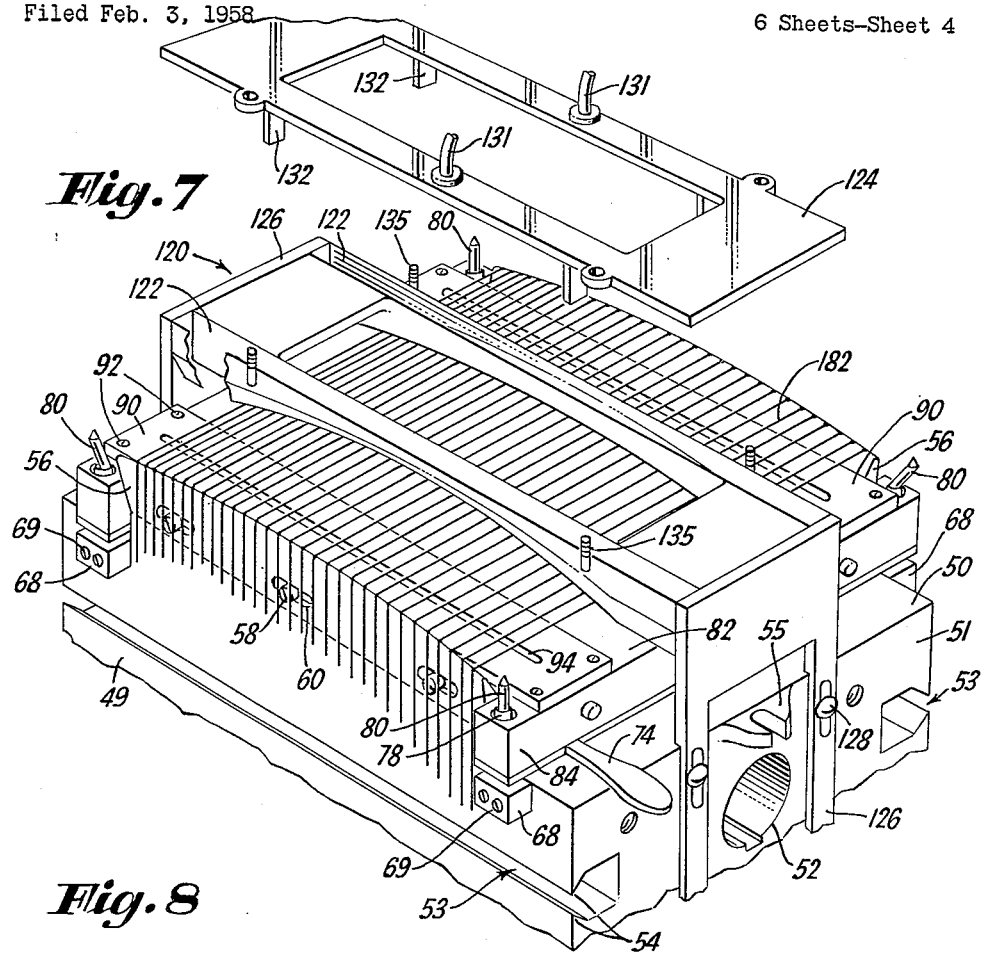
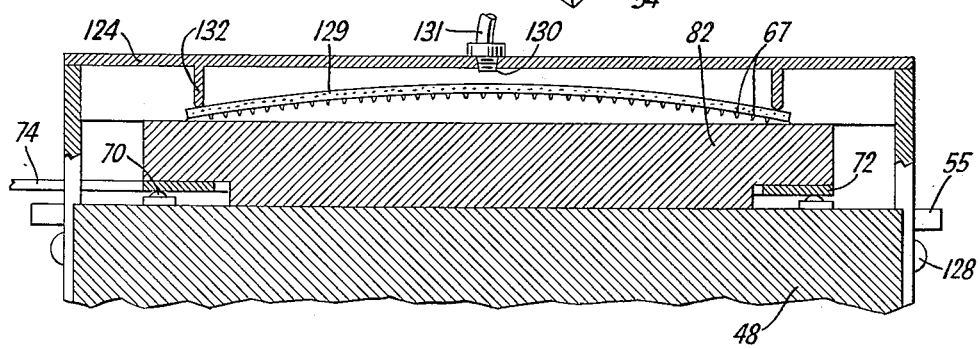
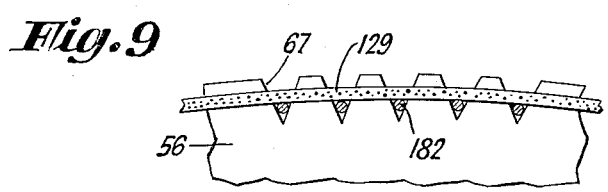
INVENTOR
AURELIUS SANDOR Sept. 12, 1961 A. SANDOR 2,999,300
APPARATUS AND METHOD FOR PRODUCING CATHODE RAY TUBES
Filed Feb. 3, 1958 6 Sheets-Sheet 5

INVENTOR
AURELIUS SANDOR

2,999,300
APPARATUS AND METHOD FOR PRODUCING CATHODE RAY TUBES

Aurelius Sandor, Forest Hills, N.Y., assignor, by mesne assignments, to Sylvania Electric Products Inc., Wilmington, Del., a corporation of Delaware
Filed Feb. 3, 1958, Ser. No. 712,871
2 Claims. (Cl. 29—25.19)

My invention relates to a method and apparatus for making cathode ray tubes to be used in color television systems.

In present color television systems, the visual image is formed upon a cathode ray tube screen provided with a plurality of screen areas separate from each other and covered with a thin electrically conductive coating. Selected groups of these areas are coated with different light emitting phosphor materials so as to produce different colored images. The electron beam generated within the tube is deflected upon each area in turn, thus producing, in well known manner, different colored images in such rapid succession that they appear visually to mix and create a composite colored image. Normally, three primary colors are used in these systems.

One type of tube employed in this manner is provided with a flat image plate or screen mounted within the evacuated tube envelope. The coated screen areas are in the form of extremely narrow horizontal or vertical strips. The first, fifth, ninth, etc. strips produce one of the primary colors, for example, red. The second, fourth, sixth, etc. strips will produce another color, for example, green. The third, seventh, eleventh, etc. strips will produce the third color, for example, blue. A single electron gun produces an electron beam, which when in its center or zero deflection position, strikes the image plate at an angle of 90°.

Interposed between the gun and the coated portion of the image plate is a beam deflecting wire grid structure containing a plurality of parallel wires. These wires extend along the long dimension of the strips, one wire being associated with each blue and red strip. The wires associated with the red strip are connected together to a first common terminal. Similarly, the wires associated with the blue strip are connected together to a second common terminal. Thus connected, an interleaved grid structure, comprising two electrically independent wire grid systems is produced. The conductive coating, disposed over the phosphor screen, is connected to a third terminal.

When the first and second terminals are maintained at the same potential, and the third terminal is maintained at a much higher potential, the potential difference acts to accelerate and focus the electron beam; the electron beam will be directed upon the green strips only, and a green raster is produced. If now the potential difference between the first and second terminals is adjusted so that the potential on the first terminal has a higher positive value than that on the second terminal, the beam will be directed upon the red strips only, and a red raster will be produced. By reversing the potentials on these two terminals, a blue raster can be produced. Color switching circuits coupled to the first and second terminals supply these potentials as required.

This type of tube has been described in the literature. For example, further details on this tube will be found in Proceedings of the I. R. E., July 1953, pages 851–858.

The present technique of manufacture of wire grids of the type described above and its assembly into the tube leaves much to be desired. For example, presently the grids are wound to produce a separate grid-screen assembly, thus requiring precision parts, and a subsequent assembly operation in order to incorporate the grid in the tube.

In the conventional method of producing the grid it is first necessary to secure the wire grid to the screen to form a grid-screen assembly. The first half of the grid system is wound in one direction. Conventionally, this assembly is produced by first winding the wires associated with the red strips upon the screen and then winding the wires associated with the blue strips upon the screen. The first winding operation is carried out by machine, the wires always being wound in the same direction. The second winding operation is manually performed by skilled technicians, the wire being wound in a reverse direction. Further, the wire alignment both with respect to the two sets of wires and to the phosphor strips must also be carried out laboriously by these technicians.

Further, great difficulty is encountered during the steps required to separate the various grid wires into two electrically independent wire grid systems within the one grid structure. Specifically, the separation of odd and even numbered wires into two groups and the interconnection of the wires of each group pursuant to producing the two independent systems is a highly tedious and time consuming operation.

In addition to the above difficulties, the process of winding the grid is a delicate one. More specifically, in the old process, it is necessary to apply sufficient tension to the wire during the grid winding process to insure that none of the wires will sag. This is a serious disadvantage since the tension required is often the cause of wire breakage during winding or during subsequent processing of the tubes.

It is therefore an object of the present invention to produce beam deflecting grids for cathode ray tubes for use in a color television system by a method which will conserve material and consequently be less expensive.

It is another object of the invention to produce beam deflecting grids for cathode ray tubes by a method wherein there is less danger of wire breakage during the grid winding phase of the process.

It is another object of the invention to make the beam deflecting grid of a cathode ray tube an integral part of the tube panel face during grid manufacture, thus eliminating the need for a separate grid frame and precision parts.

A further object of the invention is to produce and assemble within a cathode ray tube in one combined operation a beam deflecting grid having a curvature conforming to the curvature of a phosphor screen deposited on the inner surface of a tube having an inner curved face.

Another object of the invention is to prepare, finish and align a plurality of wire grids in their respective tube face panels simultaneously in one combined operation on one mandrel.

Still a further object of the invention is to effect a transfer of the wire grid from the mandrel on which it is wound to the tube face panel without disturbing the accurate spacing between adjoining grid wires.

Another object of the invention is to produce an interleaved grid structure for a cathode ray tube having two or more electrically independent grid systems wherein the separation of the wires for each system is achieved automatically with a high degree of facility and saving of time.

A still further object of the invention is to make a grid for a cathode ray tube wherein the grid wires themselves comprise substantially the entire additional weight added to the tube by the grid structure.

These and other objects of my invention will either be explained or will become apparent hereinafter.

Figure 2:
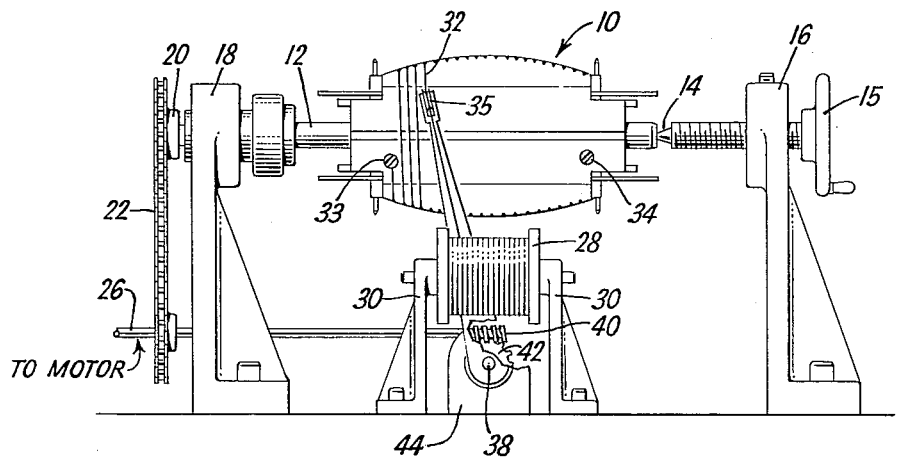
Figure 3:
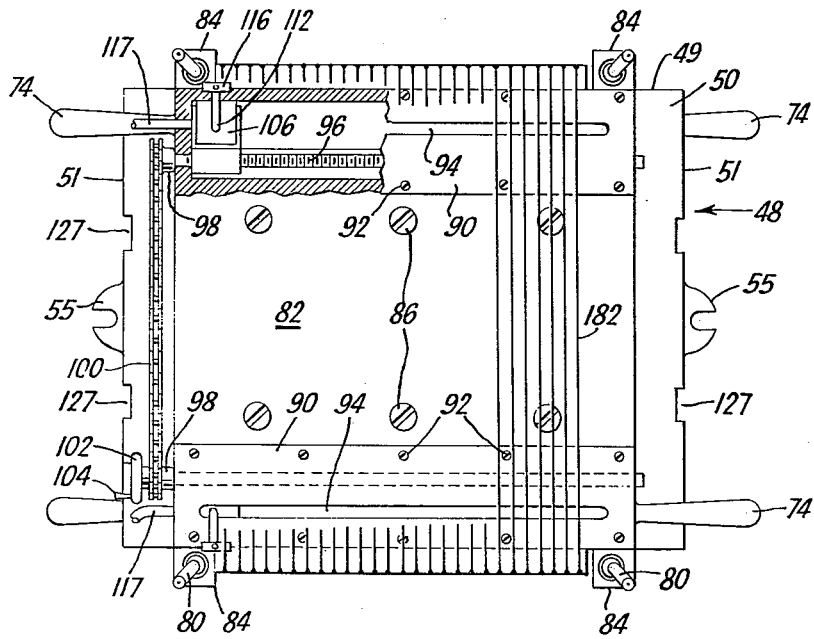
Figure 4:
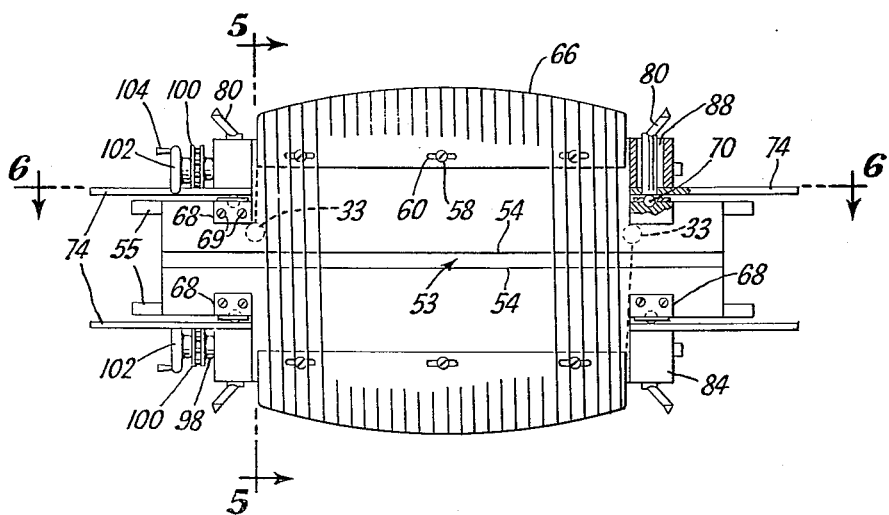
Figure 5:
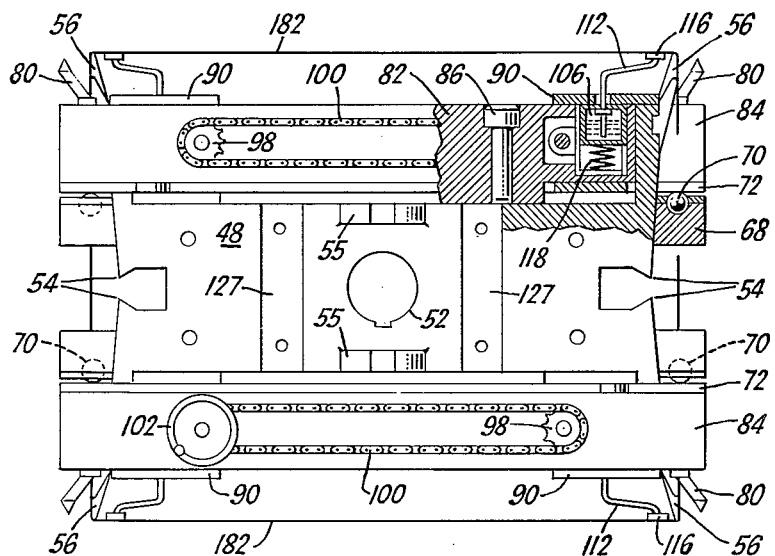
Figure 6:
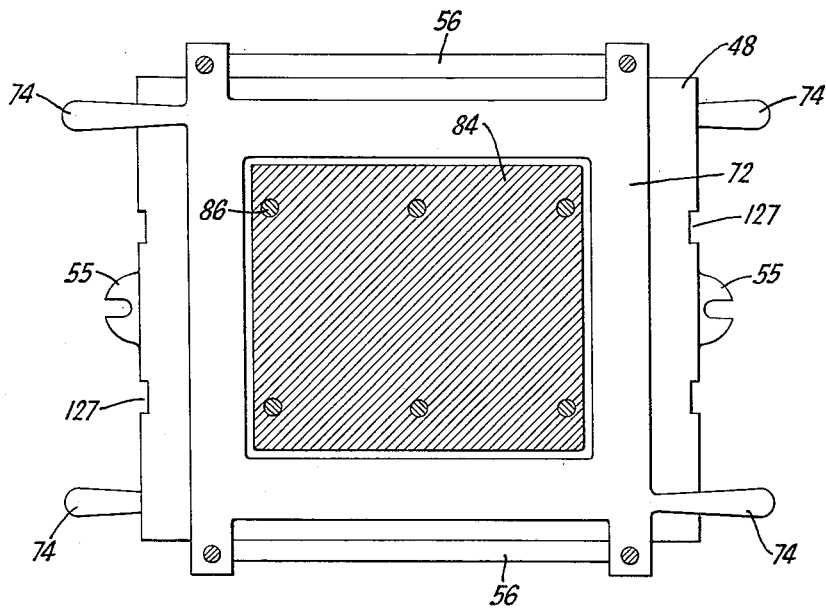
Figure 10:
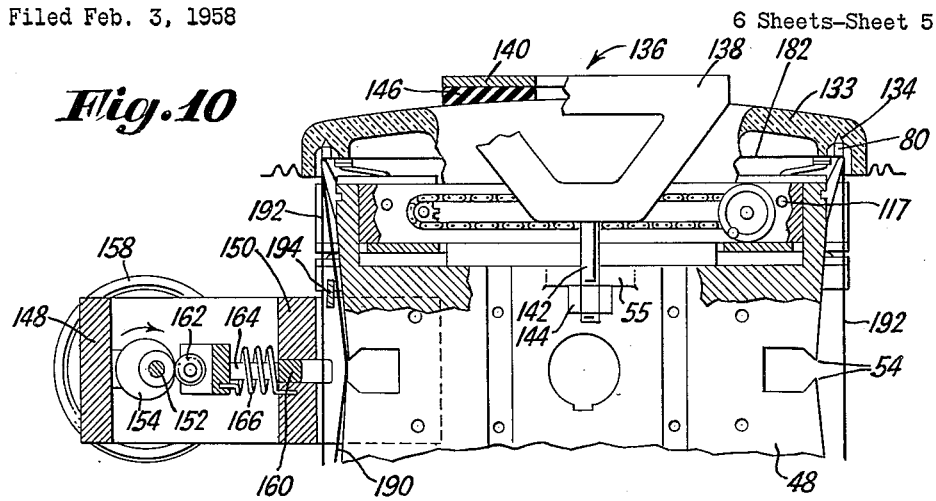
Figure 11:
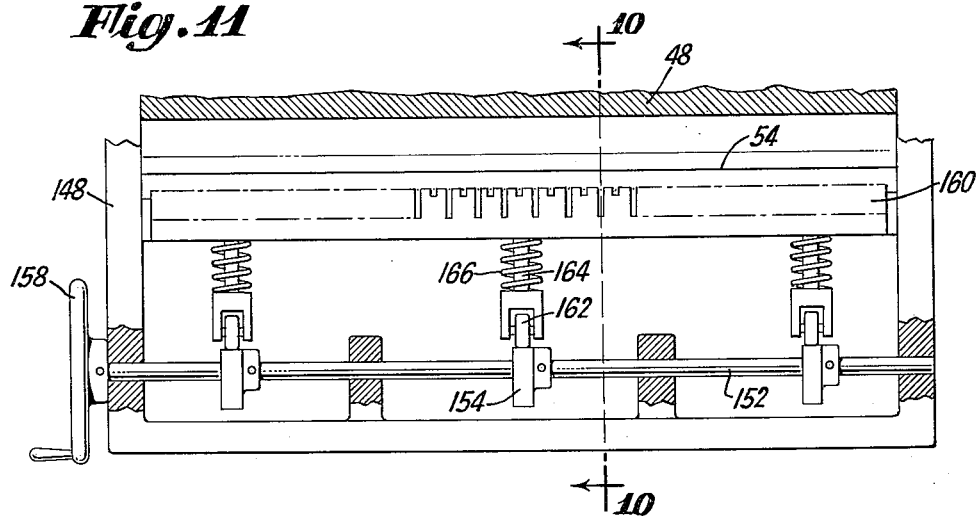
Figure 12:
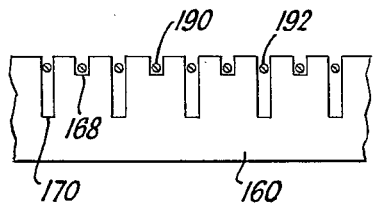
Figure 13:
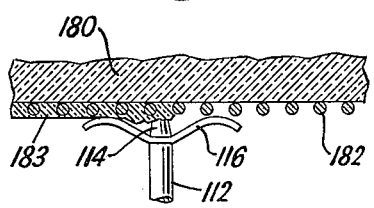
Figure 14:
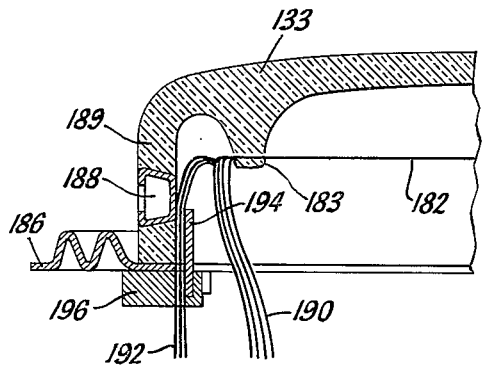
Figure 15:
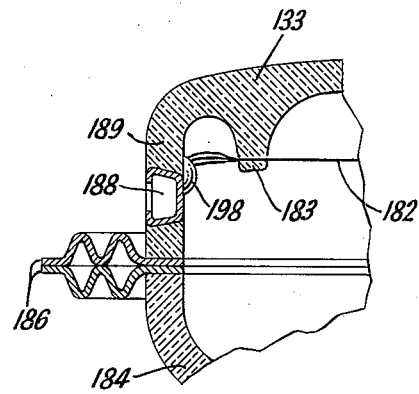
Figure 16:
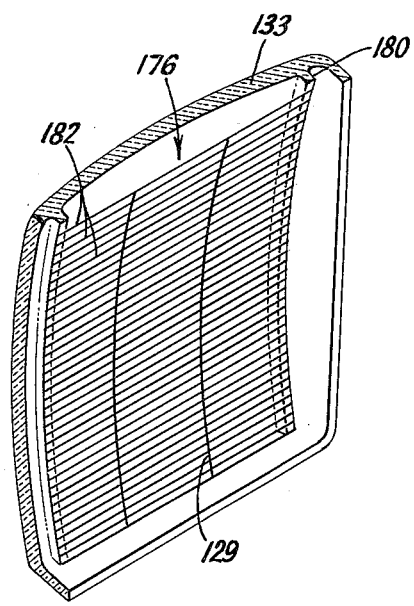

Illustrative embodiments of my invention will now be described in detail with reference to the accompanying drawings wherein:

FIG. 1 is an end elevation of a grid forming mandrel and showing means for mechanically rotating the same, FIG. 2 is a front elevation of FIG. 1, FIG. 3 is a plan view of the mandrel partly in cross section to show details of portions of a cementing assembly, FIG. 4 is a side elevation of FIG. 3 partly in cross section to show details of portions of a positioning assembly, FIG. 5 is an end elevation taken in the direction 5—5 of FIG. 4 and partly in cross section, showing further details of the cementing assembly, FIG. 6 is a cross section taken along 6—6 of FIG. 4 showing the positioning assembly for aligning phosphor strips on the tube face with the grid wires, FIG. 7 is a perspective view of the mandrel and showing a vapor producing and drying assembly for reinforcing the grid wires after they are wound around the mandrel, FIG. 8 is a longitudinal cross section of FIG. 7 showing a strand of fiber material for reinforcing the wires of the grid, FIG. 9 is an enlarged fragmentary view of a section of one of the combs which constitutes a part of the mandrel, FIG. 10 is an end view of the mandrel partly in cross section showing a face panel held in position by a bracket, and showing also cutting means for severing the wires wound about the mandrel, FIG. 11 is a fragmentary plan view of the cutting means in FIG. 10 showing in detail the cutting comb and means for operating the same;

FIG. 12 is an enlarged fragmentary view of the comb shown in FIG. 11 with wires engaged thereby, FIG. 13 depicts portions of the cementing assembly grid, and mounting bridge on the tube face panel showing the method of bonding the grid wires to the bridge, FIG. 14 is a fragmentary enlarged view of a cathode ray tube face panel showing means for grouping alternate grid wires for connection to a common terminal, FIG. 15 is a view of FIG. 14 showing alternate grid wires connected to a common terminal and showing also the means for sealing the face panel to the funnel portions of the tube, FIG. 16 is a perspective view partly cut away showing the grid wires secured to the face panel of the cathode ray tube.

In accordance with the principles of my invention I provide a mandrel, rotatable about its longitudinal axis and having a polygonal shape, whereby the surface of said mandrel is composed of a plurality of faces. Each face is provided with first and second parallel edges substantially parallel to the longitudinal axis, along each of which is positioned a comb having wire receiving grooves. Each face is adapted to receive and support a removable face panel, the face of which may be cylindrical, spherical or otherwise curved. The inner surface of the panel is coated with a light emitting phosphor screen comprising a plurality of first, second and third types of parallel narrow strips of substantially equal width. Each strip extends in a direction perpendicular to the longitudinal axis of the mandrel when the panels are positioned over the mandrel faces.

As the mandrel is rotated, wire fed by suitable means, for example a spool, is wound about the mandrel in such manner that the wire is received in the grooves of all the combs positioned along the edges, thus forming a grid structure over each mandrel face. The combs may be provided with a curvature in a direction along the axis of the mandrel so that the resulting grid structure over each face may be, for example, planar, cylindrical, spherical, convex, concave, etc. in shape.

After the wire is wound about the mandrel, demountable means are positioned over each face above the wire grid structure for reinforcing the structure and for preventing sagging and oscillation of the wires. This means includes at least one and preferably a plurality of hollow chambers extending in a direction along the longitudinal axis and having a gradually narrowing width from top to bottom, the latter defining a narrow slit sufficient to allow a thin, coated fiber to pass therethrough. The chambers are fitted with a cover plate having nozzles communicating with each chamber.

To reinforce the grid structure, a fiber, coated with a deliquescent substance is deposited in each chamber and is guided through the slit at the bottom thereof coming to rest on the top of the wire grid. Steam or other vapor supplied through the nozzles will cause the deliquescent coating on the fibers to melt and adhere to each grid wire. The application of warm air will cause a tight bond to be produced between the fibers and each grid wire, thus reinforcing the grid.

A face panel whose inner surface has a curvature matching the curvature of the grid is next positioned over each face on a suitable supporting frame. By means of shifting the frame, registration or alignment of the grid wires with the phosphor strips on the face panel is achieved with the aid of a magnifying device, for example a microscope. So positioned, a first side wall of the panel is associated with the first edge of the mandrel and a second side wall is associated with the second edge.

Means are also provided for permanently bonding the individual wires of each grid to each face panel. To accomplish this, the panels are provided with raised bridge portions at opposite first and second sides of the inside of the panel and extending the length thereof. The grid wires, which are perpendicular to these bridges and spaced contiguous to them, are then bonded thereto by the application of a suitable bonding medium, for example liquid cement.

Separating means positioned adjacent the first edge of each mandrel face and like means positioned adjacent the second edge, separate all the even numbered wires from all the odd numbered wires. While thus held separated, cutting means associated with the separating means adjacent the first edge, sever first all the odd numbered and then all the even numbered wires; this is repeated at the second edge.

The face panels are next removed from the mandrel and all the even numbered wires on the first side walls of the panels are broken off at the point where they are bonded to the bridges. The odd numbered wires then are interconnected with each other and connected to a first terminal extending through the first side wall of each panel. The same procedure is followed at the second side of the panel; the only difference is that the odd numbered wires are broken off and the even numbered ones are connected to the second terminal through the second side wall. At this point, one or more face panel-grid assemblies have been completed and are ready to be sealed to the funnel sections of cathode ray tubes for use in a color television system.

*Winding apparatus*

Referring now to the drawings, FIGS. 1 and 2 show a wire grid forming apparatus including a mandrel 10 secured to a rotatable spindle 12. The spindle is engaged at one end by a pivot 14 which is controlled by a handwheel 15, the pivot and wheel being held by a support 16. The spindle 12 rotates on a bearing in another support 18 and carries a sprocket 20 which is driven by a chain 22 which is connected to a driving sprocket 24 on a shaft 26 coupled to a source of power, for example, an electric motor, not shown.

There is also provided a spool of wire 28 adapted to rotate on supports 30 as the wire 32 is reeled off the spool by the rotating action of the mandrel 10 on which the wire is wound. In order to maintain proper tension on the wire as it winds on the mandrel, any suitable conventional braking device, not shown, may be used in conjunction with the spool 28 to prevent snarled or broken wire as it winds on the mandrel and to prevent loose strands on the finished grid. The wire is secured to the mandrel at the start of the winding operation by a screw 33 and by a screw 34 at the end of the operation.

The wire with which the grid is to be made may vary in material and diameter. The use of non-magnetic material is essential in order not to disturb the anticipated electron trajectories thus producing color misregistry. Wire of 0.001" to 0.005" diameter is desirable. The preferred materials are stainless steel or molybdenum. A cold drawn wire should be employed which has not been annealed after at least the last drawing phase of wire manufacture. The use of such a wire will automatically result in an increase in the tension on the wires of the grid as it is subjected to elevated temperatures in the usual subsequent screen bakeout process. A tension increase of 50–60% may be achieved by a proper selection of time and temperature. This effect is highly important since it permits a very low tension to be applied to the wire during the winding operation, thus further reducing wire breakage.

Between the mandrel and the spool there is a guide roller 35 on the end of an arm 36 secured to and pivoted about the axis of a shaft 38. Shaft 38 is driven by the driving shaft 26 through the worm and sector 40, 42, gear reduction box 44 and coupling 46. The ratio of speeds of shaft 38 with respect to shaft 26 is such that the guide roller will insure the accurate registration of the wire in grooves provided therefor on the mandrel. The result is less wire breakage and more even tension from wire to wire in the finished grid.

The mandrel 10 of FIGS. 1 and 2 will now be described in detail, with reference to FIGS. 3, 4, 5 and 7. The mandrel is polygonal in shape so that a plurality of grids, preferably two, are formed each time the wire winding operation about the mandrel is completed. A metal block 48 having opposed sides 49, opposed faces 50 and opposed ends 51, forms the base for the mandrel. Each face has two parallel edges defined by the intersections of the faces and sides, and being substantially parallel to the longitudinal axis of the mandrel. The block is provided with a central aperture 52 concentric with the longitudinal axis and having a keyway to secure the mandrel to the spindle 12. The block is provided at each side 49 with longitudinal slots 53 having shearing edges 54 and with a projecting slotted lug 55 at each end 51.

Four combs 56 which may be metal, plastic, or other suitable material, are secured to the block 48 along the edges thereof by means of set screws 58. Longitudinal slots 60 are provided in each comb to allow for the precise accurate positioning thereof. A longitudinal tongue and groove arrangement 62, 64 (FIG. 5) is further provided in the combs and block respectively to prevent any comb from slipping out of its accurately determined position. The edges 66 of the combs have a curvature, clearly shown in FIGS. 2, 4, 7, 8 and 9, such that the curvature of the grids wound thereon matches the curvature of the inner surface of the face panels to which the grids are subsequently secured. The combs are provided with accurately milled wire receiving grooves 67 clearly depicted in FIGS. 8 and 9. The grooves have a V shape to facilitate the proper lateral positioning of the wire as it is wound about the mandrel. The distance between the centers of the V grooves will be determined by tube design, .025" to .035" being the usual range. Grids of different pitch dimensions may be wound by merely substituting combs having the requisite pitch.

The block 48 is further provided with eight bearing blocks 68, fastened by means of screws 69, the top edges being flush with the face of the block 48. Each bearing block carries a recessed ball bearing 70.

*Movable face panel support*

A rectangular frame 72, having a central opening and provided with handles 74 is positioned over each opposed block face 50 and may be moved in any direction in its plane to line up the grid wires with the phosphor screen on the picture tube face panel as will later appear. Four protruding portions 76 are provided on the frame, each for carrying vertically disposed aligning pins 78 having smaller diameter offset portions 80 with pointed ends to support a cathode ray tube face panel. These pins are positioned essentially above the ball bearings 70, which in turn support the weight of the panel.

A plate 82 having a generally rectangular shape with four outwardly extending portions 84 is fastened to each face of the block 48 by screws 86. The top of each such plate constitutes a separate face of the mandrel. The extending portions 84 are provided with cylindrical apertures 88 through which the pins 78 extend. These apertures are large enough to allow for approximately 1/8" lateral movement of the pins within the aperture as the frame 72 is moved to align the phosphor striped screen on the panel face with the grid wires.

*Cementing apparatus*

Two narrow cover plates 90 are fastened at their ends by screws 92 to the plate 82. These plates are provided with a central longitudinal slot 94. Beneath each cover plate 90 is a threaded shaft 96. These shafts are supported at each end and are adapted to rotate in an aperture in the plate 82. The shafts extend at one end beyond one end of the plate 82, the extensions being fitted with sprockets 98 (FIGS. 3, 4 and 5) of equal diameter and number of teeth. A chain 100 couples the sprockets of the two shafts at each face of the mandrel. One of the shafts further carries a wheel 102 having a handle 104 for hand rotation.

As the wheel is turned, a cementing assembly (FIG. 5) located under each of the two cover plates on each face, is caused to move along the shaft 96, parallel to the longitudinal axis of the mandrel. The assembly comprises a holder 106 having a bracket 108 with an internal thread for engagement with the thread on the shaft 96. The holder carries a vessel 110 which contains a suitable cement or glue to bond the grid to the face panel. Extending through the top of the vessel and through the longitudinal slot 94 in the cover plate is a piece of tubing 112 having a nozzle 114 and a leaf spring 116 at its free end. Extending through the side of the vessel is a flexible hose 117 to supply compressed air to the vessel. A helical compression spring 118 is provided to press the leaf spring against the grid wires during the cementing operation to aid in forcing the glue against the wires and face panel and to follow automatically the curved shape of the face panel, see FIGS. 13 and 16.

*Fibre positioning and setting apparatus*

FIGS. 7 and 8 show details of a demountable vapor producing and drying assembly 120 adapted to be mounted on the mandrel over the grid. This assembly comprises two longitudinal steam and drying chambers 122, a cover plate 124, and two brackets 126 which are received by the slots 127 to cooperate in holding the unit securely to the mandrel by means of screws 128. The chambers have sides which shape inwardly toward the bottom defining a slit of approximately 1/32" in width to allow a thin coated fiber thread to pass therethrough. The cover plate is provided with two nozzles 130 connected to hoses 131 to conduct vapor, for example steam and alternately warm air into each chamber. The cover is further provided with four legs 132 to seat the fiber thread properly on the grid wires.

Wing nuts, not shown, cooperate with threaded studs 135 to hold the cover plate over the channel members during the vapor and drying steps.

Clamping apparatus

A clamping means for holding a cathode ray tube face panel 133 in position while the grid is transferred to the panel is shown in FIG. 10. The face panel is provided with four accurately ground conical recesses 134 which cooperate with the offset portions 80 of the pin 78 to support and align the panel over the grid wires on the mandrel.

A bracket 136 which has two parallel side portions 138 and a bridge portion 140, is shown as one piece, but may be made with hinged or flexible sides, if desired. Bolts 142, extending from each side portion 138 through the slots in the lugs 55, are provided with nuts 144 which cooperate with the lugs in holding the bracket 136 against the face panel to hold the latter in place. A piece of soft leather 146 is provided between the bracket bridge portion and the face panel to protect the latter from scratches.

Grid wire separating and cutting apparatus

The details of a separating and cutting assembly used to sever the wires wound on the mandrel to facilitate removal of the grids therefrom are shown in FIGS. 10, 11 and 12. One such assembly is associated with each side 49 of the block 48. A frame 148 for the cutter assembly having a bridge section 150, is held in fixed relation to the block 48 and supports a shaft 152 having three cams 154 pinned thereon and actuated by a handwheel 158. A cutting comb 160 is held in slidable relation to the bridge 150. Cutting motion is imparted to the comb by the cams 154 through the rollers 162 and connecting rods 164. Helical compression springs 166 are provided to impart return motion to the comb after the cutting operation. The cutting comb is provided with recessed wire receiving slots of two depths 168 and 170 for cutting alternate wires embraced therein at spaced intervals, as will later appear. The severing of the wires is achieved by the cooperation of the cutting comb 160 with the shearing edges 54 on the block 48.

The above described apparatus is employed to manufacture a plurality of grids and to assemble them in their respective face panels, the method for which will soon appear in detail. The finished grid 176, FIG. 16, is secured to a face panel 133 having two raised bridge portions 180. Each individual wire 182 of the grid is secured at each of its ends to these bridge portions. The face panel carries a conducting terminal button 188 extending through each opposite side wall 189 of the face panel to afford external connections to the grid. The button in one wall is connected to all odd numbered wires and the button in the opposite wall is connected to all even numbered wires. The face panel is sealed to the funnel portion 184 of the picture tube, FIG. 15, by welding two Kovar rings 186 together, one of which is hermetically sealed to the funnel portion and the other to the face panel.

Winding of the grid

The method of making and securing the grid to the face panel will now be described. With the arm 34 in its extreme left position, the end of the wire on the spool 28, FIGS. 1 and 2, is fed over the guide roller 35 and secured to the mandrel 10 by the screw 33. Any slack in the wire is now taken up and the motor, not shown, is turned on, causing the assembly to rotate at a preferred speed of about 200 revolutions per minute. When the guide roller has reached the extreme right end of the mandrel, there will be a grid wire in each V groove. The motor is now turned off and the wire 32 is severed from the spool and secured taut to the screw 34. The assembly is now rotated so that the grid wires 182, FIGS. 3, 4 and 7, are in a horizontal plane.

Application of reinforcing fibres

The next step is the grid reinforcing operation. The vapor and drying assembly 120 is lowered over the grid so that the lower portions of the chambers 122 are approximately 1/32" above the grid wires; the assembly is then fixed in place by tightening the screws 128. A glass fiber 129, FIG. 16, is used to reinforce the grid, but must be first treated in the following manner. The fiber, which may be for example a .002" diameter Pyrex thread, is coated with a solution of a deliquescent substance by any suitable coating method, to a thickness of approximately .004" and then allowed to dry.

A preferred coating material comprises an aqueous solution of potassium silicate. Other deliquescent substances, however, may also be used. The solution should contain a substance, such as magnesium oxide, capable of copiously effecting secondary emission when bombarded by the electron beam. The presence of this material in the coating on the fiber will minimize the shadow which results from the interception of the electron beam by the fiber. Any suitable coating method, for example dipping or spraying, may be used.

A coated fiber is dropped into each chamber 122 and is guided by the sloped sides thereof down through the narrow slit at the bottom of the chamber and onto the grid wires 182. The cover plate 124 is next lowered over the studs 135 on the drying chambers so that the legs 132 projecting therefrom contact the fibers near their ends. This presses the ends of the fibers downward thereby bowing the fibers to conform with the curvature of the grid, and also covers the chambers 122, see FIGS. 7, 8 and 9. Steam vapor is now fed into the chambers through the hoses 131 and nozzles 130 and passes through the slits in the bottom of the chambers. The vapor is quickly absorbed by the silicate coating on the fibers directly beneath the slits, causing the coating to achieve a state of low viscosity flow. Adhesive forces and surface tension will then cause the liquified silicate to flow between the fiber and grid wires at each cross over point forming small globules thereat. The steam is then shut off and warm dry air is fed into the chambers, causing the silicate to harden and form a strong bond between the fibers and the grid wires. The demountable assembly is now removed by loosening the screws 128 and lifting the assembly. The mandrel is then turned 180° and the assembly is placed over the grid on the opposite mandrel face to repeat the reinforcing operation as just outlined for the first grid.

Aligning grid wires with panel strips

The next step is to cement the wires of the grid to the face panel. With the mandrel still positioned so that the grid wires are horizontal, a face panel 133 having a phosphor screen comprising a plurality of substantially parallel light emitting strips covered with an aluminum coating is lowered over the mandrel so that the points on the pins 78, 80 engage the four conical recesses 134 located on the inner face of the panel, FIG. 10. The space between the wires 182 and the glass bridge 180 on the panel should be between .001" and .030".

At this point, a microscope, not shown, is placed upon the face panel and by means of the handles 74, the frame 72 carrying the face panel supporting pins 78, 80 is moved back and forth on the ball bearings 70 until both ends of the center phosphor strip on the panel are lined up with the center grid wire. The aluminum coating is provided with a small opening at each end of the center strip to facilitate alignment. The microscope is then removed. The face panel is now retained in its proper position by lowering the bracket 136 over the face panel and securing it by tightening the nuts 144 against the lugs 55. After the bracket is secured, it is desirable to check the line-up of the strips with the wires to be sure there has been no movement of the panel during this clamping operation. The mandrel is then rotated 180° to receive a face panel over the other grid and to be aligned therewith.

Cementing grid wires to face panel bridges

The next step is a cementing or bonding operation which secures each grid wire 182 to the bridge 180 on the panel by a band of cement 183, FIGS. 14 and 15. This is accomplished by moving the two upper cementing vessels 110 along under the screw action of the shafts 96 as the upper handwheel 102 is turned. The liquid cement is ejected from the nozzle 114 by compressed air that is supplied to the vessel by the hose 117. The leaf spring 116 on the end of the tubing 112 sweeps along the wires 182 as it travels, working the cement into close contact with the wires and the glass bridge 180 to form a strong cement bond between them. Although the travel of the vessel is linear and the shape of the bridge is curved, the leaf spring is kept in contact with the grid wires throughout its entire travel by means of the action of the compression spring 118. The cementing operation, now complete, is repeated on the other face panel, first rotating the mandrel so that this panel is at the top of the mandrel. If preferred, however, the cementing operation may be carried out on each panel at the bottom of the mandrel. When the cementing operation is complete on this panel, warm air is blown against both panels to speed up the drying of the cement.

The optimum speed of travel of the cementing vessel is a function of various factors including the air pressure, size of nozzle, viscosity of cement and spacing from wires to bridge; for a panel having a 21" diagonal dimension, I have found 10 seconds to produce excellent results. The cement must have good insulating qualities. There are a number of such cements commercially available; their application is not generally critical and the results are good. It should be remembered, however, that the cement chosen must have a fairly high strength, must not chip and must not lose its good insulating quality when subjected to elevated temperatures during subsequent processing of the tube.

Wire separation and severing

The next step in the process is the wire severing operation. Two demountable cutting assemblies are secured to opposite sides 49 of the mandrel, in such position that the grid wires will be received by the slots in the cutting comb 160.

Since an interleaving grid structure is desired, all the odd numbered wires must be interconnected and separated from all the even numbered ones, which are also interconnected, so that finally two electrically independent wire systems are produced within the grid. This is effected, as will be seen, with the aid of two sets of wire receiving slots 168 and 170, each having a different depth, on the cutting comb 160.

FIG. 10 shows the cutting comb in its inactive or base position. Revolving the handwheel 158 will cause the cams 154 to urge the comb 160 in the direction of the vertical wires extending between the upper and lower grids disposed over opposed faces of the mandrel, so that alternate wires are engaged by the slots 168 and 170, as shown in FIG. 12. The wheel is turned until alternate wires are engaged the full depth of the deeper slots 170. At this point, there will be a spatial separation between the group of wires engaged by the shallow or even numbered slots 168 and the group engaged by the deep or odd numbered slots 170, the wires engaged by the slots 168 being shown at 190, and those engaged by the slots 170 being shown at 192. A thin strip of material 194 is wedged into the space between these two groups of wires 190, 192 to maintain the sets separate from each other. The comb is now urged further toward the mandrel block 48 where the wires engaged by the slots 168 are first severed and those engaged by the slots 170 are next severed, both by the action of the shearing edges 54 on the block 48. Thus, the comb serves two purposes: it separates the wires into two groups and it severs the wires. Turning the handwheel further allows the springs 166 to urge the comb back to its base position. The demountable cutting assembly is now removed from the mandrel.

Only the left hand cutting assembly is shown in FIG. 10; the cutting assembly mounted on the right side of the mandrel is identical with it. However, the right hand assembly is mounted on the mandrel so that the wires which fall into the shallow slots 168 on the left assembly fall into the deep slots on the right assembly and vice versa. In other words, the combs on opposite cutting assemblies are longitudinally displaced with respect to each other by one wire spacing.

The separating strips 194 are then pressed against opposed glass walls 189 of the face panel 133, FIGS. 14 and 15; using two small permanent magnets 196, at each end of the strips, shaped to serve as clamps to hold the strips in position. The magnets are held in position by the ferromagnetic Kovar rim 186 on the face panel. The nuts 144 are now removed to release the bracket 136, thereby allowing the top face panel with its grid attached to be lifted from the mandrel. The mandrel is then rotated 180° and the lower panel removed in like fashion.

The innermost group of wires 190, FIGS. 14 and 15, is now grasped, and manually bent back and forth until the wires break at the junction point with the band of cement 183. This operation should be conducted with the panel kept in the position shown in FIG. 14 so that no wires can fall into the panel and thereby damage the phosphor screen. The same method is applied to remove the innermost wires, not shown, on the opposite side of the face panel.

Connection of grid wires to conducting terminal buttons

The next step is to make an electrical path between each of the wires in the group 192 and to the button 188 shown in FIGS. 14 and 15. This is achieved with the face portion of the panel in a vertical position, by applying a band 198 of conductive cement, FIG. 15, over the wires 192 along the length of the side wall 189. This bond should be applied alongside the separating band 194 so that it automatically traverses the button 188 as it is applied. The same method is applied to the wires at the opposite wall of the face panel not shown to thereby interconnect the wires of the group 190 and to connect this group to the terminal button in that wall.

The cement should of course be a type that will not give off gas in a vacuum. It is preferably applied with a syringe and worked with a roller to insure good contact between the wires and the cement. Warm air is then blown onto the cemented areas to hasten drying.

The magnets 196 and separating strips 194 are then removed. The loose ends (not shown) of the wires 192 extending beyond the band of cement 198 are then broken off at the cement band by a normal back and forth motion. This is also done on the wires 190 on the opposite side wall of the panel.

The completed panel grid assemblies are now ready to be sealed to their funnels, FIG. 15, by means of welding the two rims 186 together.

Certain types of grid focusing color tubes make use of three separate electron guns; in such types the two sets of grid wires are not interleaved but instead are interconnected as a unipotential grid system. It will be obvious to those skilled in the art that by eliminating the steps required to produce the interleaved structure, the unipotential structure can be produced by my apparatus.

While I have shown and pointed out my invention as applied above, it will be apparent to those skilled in the art that many modifications can be made within the scope and sphere of my invention.

What is claimed is:

1. Apparatus for manufacturing grid structures for cathode ray tubes comprising a polyhedronal mandrel rotatable about an axis; a pair of wire supporting combs adjustably fastened to a pair of opposed surfaces of said mandrel and parallel to the axis of rotation of said mandrel; means for rotating the mandrel and winding wire over said combs so as to form a grid of parallel wires between the combs; slotted means extending in the direction of the axis of the mandrel carried by said mandrel and means, movable within and along said slotted means, for applying cement to wires across said parallel combs.

2. Apparatus for manufacturing grid structures, two at a time, comprising a polyhedronal mandrel rotatable about an axis; two pairs of wire supporting combs, each pair being oppositely and adjustably fastened to a pair of opposed surfaces of said mandrel and parallel to the axis of rotation of said mandrel; means for rotating the mandrel and winding wire over said combs so as to form, on a pair of opposite sides of said mandrel and over said pairs of combs, two grids of parallel wires; slotted means, extending in the direction of the axis of the mandrel and carried by said mandrel; and yieldable means, within said slotted means and movable therealong for applying cement to between and across the wires extending over said combs forming said grids of parallel wires.

References Cited in the file of this patent

UNITED STATES PATENTS

| | | |
|---|---|---|
| 1,117,059 | Kremenezky et al. | Nov. 10, 1914 |
| 1,478,071 | Trimble | Dec. 18, 1923 |
| 1,487,288 | Thronson | Mar. 18, 1924 |
| 1,585,905 | Madden et al. | May 25, 1926 |
| 2,608,743 | Reed | Sept. 2, 1952 |
| 2,643,440 | Flaws et al. | June 30, 1953 |
| 2,683,833 | Zaphiropoulos | July 13, 1954 |
| 2,701,847 | Yanagisawa et al. | Feb. 8, 1955 |
| 2,703,850 | Machlett | Mar. 8, 1955 |
| 2,795,840 | Salecker | June 18, 1957 |
| 2,842,696 | Fischer-Colbrie | July 8, 1958 |
| 2,872,721 | McGee | Feb. 10, 1959 |